(12) United States Patent
Rouleau

(10) Patent No.: US 11,651,869 B2
(45) Date of Patent: May 16, 2023

(54) THERMAL EXPANSION SLIDE WITH CABLE CLAMP

(71) Applicant: Panduit Corp., Tinley Park, IL (US)

(72) Inventor: Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 2 days.

(21) Appl. No.: 17/304,220

(22) Filed: Jun. 16, 2021

(65) Prior Publication Data

US 2021/0407703 A1 Dec. 30, 2021

Related U.S. Application Data

(60) Provisional application No. 63/045,239, filed on Jun. 29, 2020.

(51) Int. Cl.
| | |
|---|---|
| *H01B 7/00* | (2006.01) |
| *F16L 3/10* | (2006.01) |
| *F16L 3/18* | (2006.01) |
| *H01B 17/58* | (2006.01) |

(52) U.S. Cl.
CPC .......... *H01B 7/0045* (2013.01); *F16L 3/1091* (2013.01); *F16L 3/18* (2013.01); *H01B 17/583* (2013.01)

(58) Field of Classification Search
CPC ... H01B 7/0045; H01B 17/583; F16L 3/1091; F16L 3/18
USPC .............. 248/70, 74.4, 74.1, 223.31, 73, 72, 248/223.41, 67.7, 228.1, 49, 228.2, 248/229.11
See application file for complete search history.

(56) References Cited

U.S. PATENT DOCUMENTS

| | | | |
|---|---|---|---|
| 2,355,742 A | | 8/1944 | Morehouse |
| 2,696,139 A | | 12/1954 | Attwood |
| 3,683,450 A | | 8/1972 | Morrison et al. |
| 4,073,114 A | | 2/1978 | Irish |
| 4,595,165 A | * | 6/1986 | Klingensmith ...... H01Q 1/1221 248/539 |
| 4,662,590 A | * | 5/1987 | Hungerford, Jr. .... F16B 37/045 403/353 |

(Continued)

FOREIGN PATENT DOCUMENTS

| | | |
|---|---|---|
| EP | 1957844 A1 | 8/2008 |
| EP | 2550473 B1 | 3/2016 |

(Continued)

OTHER PUBLICATIONS

Thorne & Derrick: "Ellis Patents No Bolts Cleat—Polymeric Cable Cleats for Rail Cables", Mar. 7, 2019 (Mar. 7, 2019), XP055859526, Retrieved from the Internet: URL:https://www.youtube.com/watch?v=ZFCTEI zYkvk&t=93s [retrieved on Nov. 9, 2021]; 2 pgs.

*Primary Examiner* — Anita M King

(74) *Attorney, Agent, or Firm* — Christopher S. Clancy; James H. Williams; Peter S. Lee

(57) ABSTRACT

A cable management system configured to account for and accommodate physical movement of the cables being managed. The cable management system includes an elastic element, such as a spring, to accommodate for the anticipated expansion and/or contraction movements of the cables being managed. The cable management system may be applicable for vertical cable installation projects that are installed in outdoor applications.

20 Claims, 8 Drawing Sheets

(56) References Cited

U.S. PATENT DOCUMENTS

| | | | | |
|---|---|---|---|---|
| 5,261,633 A | * | 11/1993 | Mastro | F16L 3/18 |
| | | | | 248/68.1 |
| 5,332,183 A | * | 7/1994 | Kagayama | B62J 6/03 |
| | | | | 248/223.41 |
| 7,614,593 B2 | | 11/2009 | McClure et al. | |
| 7,770,848 B2 | * | 8/2010 | Johnson | F16L 3/1207 |
| | | | | 248/65 |
| 8,227,695 B2 | | 7/2012 | Ueno et al. | |
| 8,513,529 B2 | | 8/2013 | Vadstrup | |
| 8,998,150 B2 | | 4/2015 | McMiles et al. | |
| 9,341,206 B2 | | 5/2016 | Rouleau et al. | |
| 9,601,241 B2 | * | 3/2017 | Dannenberg | H02G 3/32 |
| 10,145,364 B2 | | 12/2018 | Schmitt | |
| 10,221,994 B2 | * | 3/2019 | Baiera | F16L 3/237 |
| 10,266,122 B2 | | 4/2019 | Rouleau | |
| 10,302,249 B1 | | 5/2019 | Kelly | |
| 10,541,523 B2 | | 1/2020 | Wang et al. | |
| 2014/0259566 A1 | * | 9/2014 | Rouleau | F16L 3/243 |
| | | | | 24/457 |
| 2015/0083463 A1 | | 3/2015 | Dannenberg | |
| 2015/0260166 A1 | | 9/2015 | Olesen | |
| 2015/0276092 A1 | | 10/2015 | Oliver et al. | |
| 2019/0154008 A1 | | 5/2019 | Yagci | |

FOREIGN PATENT DOCUMENTS

| | | |
|---|---|---|
| FR | 3001175 A1 | 7/2014 |
| GB | 2519729 B | 5/2017 |
| KR | 200900634740 A | 6/2009 |
| WO | 2014206536 A1 | 12/2014 |

\* cited by examiner

THERMAL EXPANSION SLIDE WITH CABLE CLAMP

CROSS-REFERENCE TO RELATED APPLICATION(S)

This application claims benefit to U.S. Provisional Patent Application No. 63/045,239, filed on Jun. 29, 2020, the entirety of which is hereby incorporated by reference herein.

FIELD OF TECHNOLOGY

This disclosure relates to a cable management system configured to account for and accommodate physical movement of the cables being managed.

BACKGROUND

Cable management, especially in outdoor applications, presents installation complications due to expansion and/or contraction movements in the cables as the cables are exposed to the elements (e.g., temperature fluctuations). In addition to the cable movements caused by exposure to the elements, cables have a tendency to naturally expand in a process referred to as cable creep. Proper cable management systems strive to firmly hold onto cables to prevent cable creep, while also allowing for the movement in the cables from the expansion and/or contraction movements caused by the elements.

SUMMARY

This disclosure relates to a cable management system configured to account for and accommodate physical movement of the cables being managed. The cable management system is configured to provide an elastic element, such as a spring and/or sliding mechanisms, to accommodate for the anticipated expansion and/or contraction movements of the cables being managed. The elastic element is an improvement over strictly rigid members that do not provide any accommodations for movements in the cables being managed. The cable management system may be especially useful for vertical cable installation projects such as those used in wind turbine applications.

According to an embodiment, a cable management system is disclosed. The cable management system comprising a slider strut comprising a slider channel, and an elastic element installed within the slider channel. The cable management system further comprising a cable clamp comprising a lower clamp installed within the slider channel to rest on the elastic element, an upper clamp, a first compression grommet sleeve attached to the lower clamp, and a second compression grommet sleeve attached to the upper clamp.

A detailed description of these and other non-limiting exemplary embodiments of a cable management system, and method of installation, is set forth below together with the accompanying drawings.

DETAILED DESCRIPTION

Detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein may not be limiting, and are provided as a representative basis for teaching one skilled in the art.

This disclosure relates to a cable management system configured to account for and accommodate physical movement of the cables it manages. The cable management system is configured to provide an elastic element, such as a spring and/or sliding mechanism, to accommodate for the anticipated expansion and/or contraction movements of the cables being managed. The elastic element is an improvement over strictly rigid members that do not provide any accommodations for movements in the cables being managed. The cable management system may be especially useful for vertical cable installation projects such as those used in wind turbine applications, and/or horizontal cable installation project taking place outdoors where the elements may be a factor in moving the cables.

Figure 1:
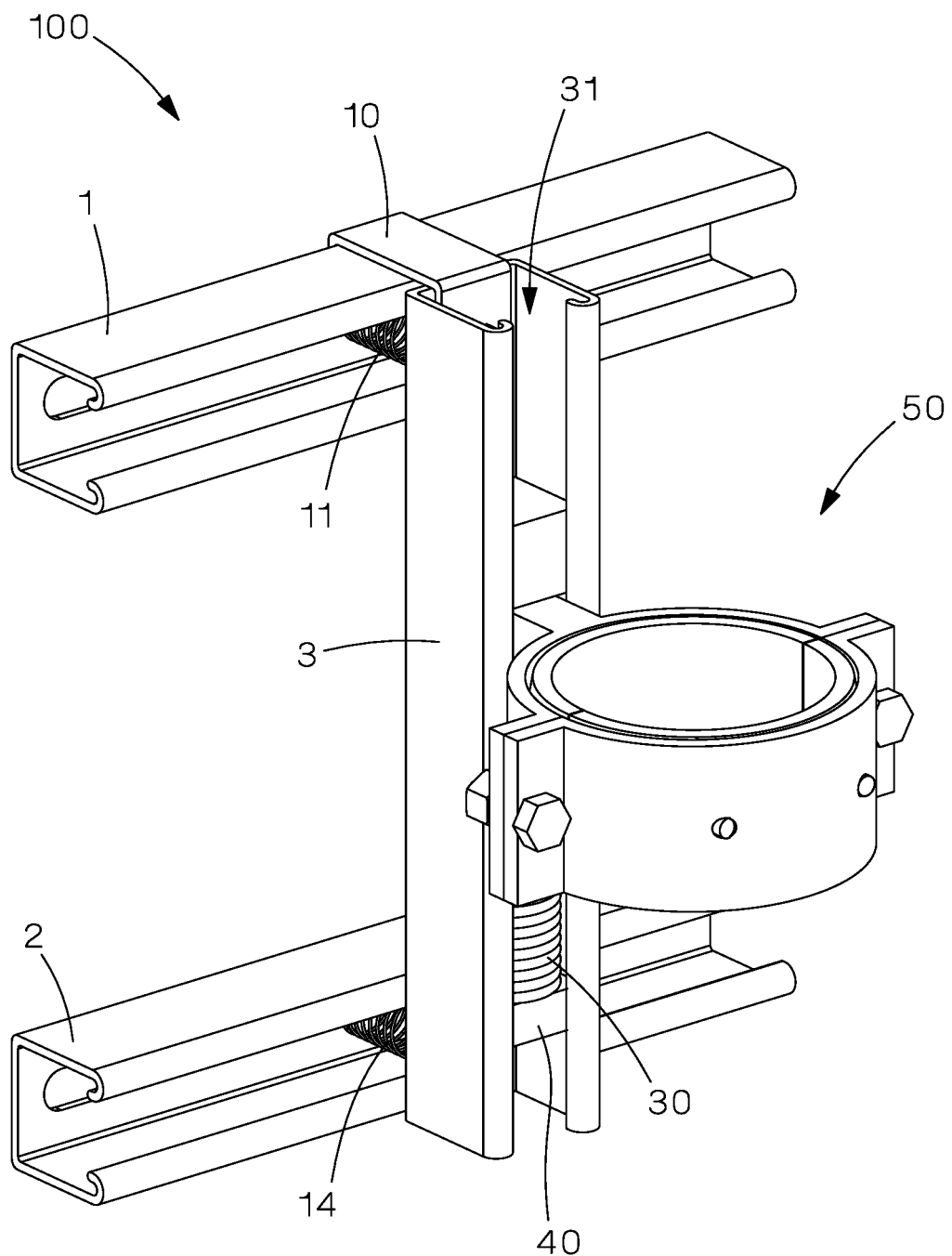
FIG. 1 is a front perspective view of an exemplary cable management system, according to an embodiment.

FIG. 1 illustrates an exemplary cable management system 100 that includes a cable clamp assembly 50 installed onto a slider strut 3, where the slider strut 3 is attached to a first strut 1 and a second strut 2. The first strut 1 and/or the second strut 2 may be included in the cable management system 100. Alternatively, first strut 1 and/or the second strut 2 may be included as part of an outdoor system (e.g., wind turbine system) onto which the cable management system 100 is attached for managing cables.

Figure 2:
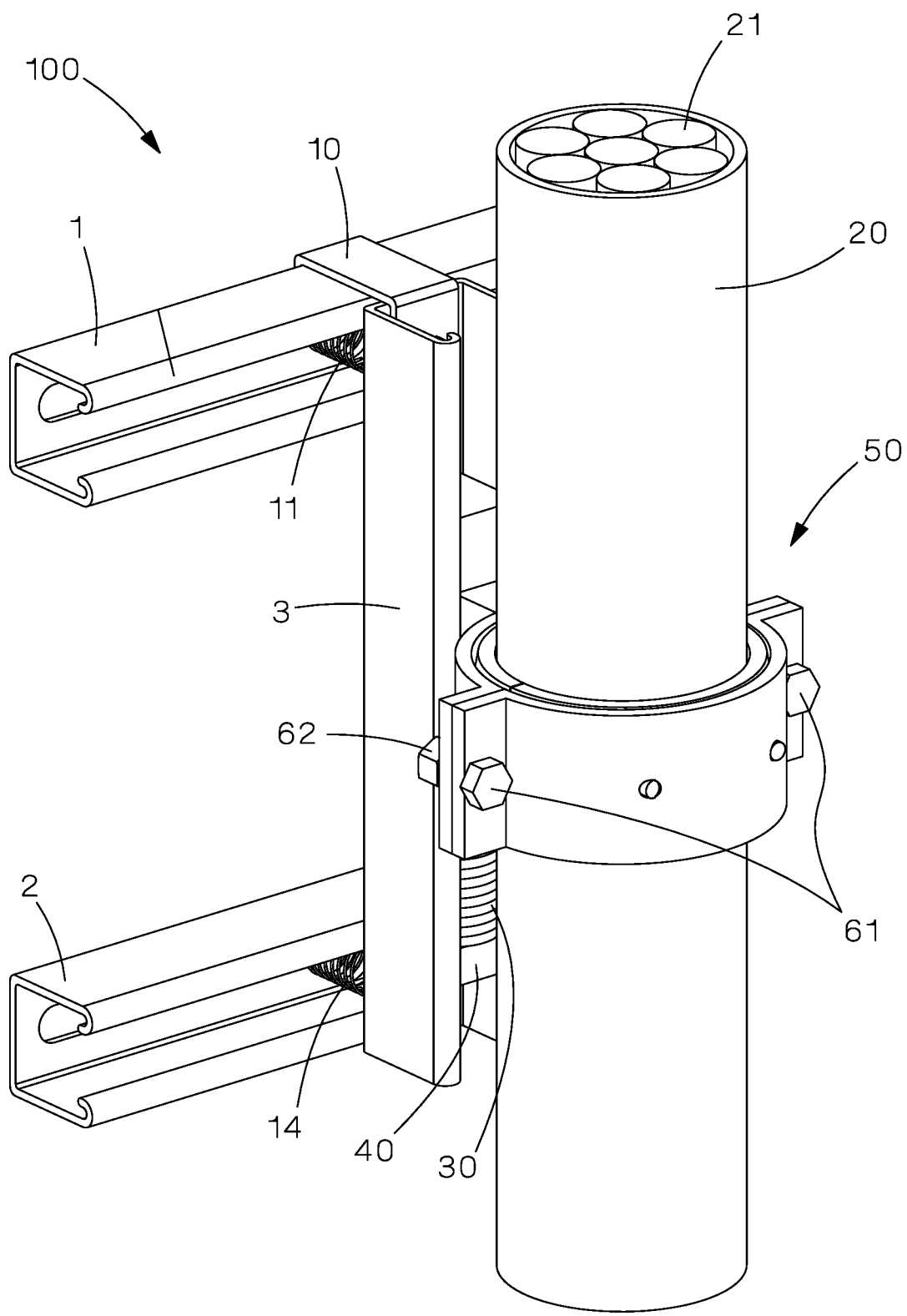
FIG. 2 is the front perspective view of the cable management system shown in FIG. 1, having a cable installed into the cable management system.

FIG. 2 shows the cable management system 100 in an assembled state where the cable clamp assembly 50 has been inserted down through the slider channel 31 of the slider strut 3 to rest on top of an elastic element such as the support spring 30. The support spring 30 is shown to sit on top of a rigid stop 40 installed within the slider channel 31 of the slider strut 3. In this assembled state shown in FIG. 2, the cable clamp assembly 50 is shown to be securely holding a cable 20 installed within it. The cable 20 may be a cable having an outer insulation jacket layer and one or more conductors 21 (e.g., conductive wires) inside the insulation jacket layer, or other type of cable used to transmit information/data. Although not expressly illustrated, the top of the slider channel 31 may be closed off with a capping member such as, for example, another rigid stop 40 at the top end of the slider channel 31.

The support spring 30 may be a polymer spring made from an elastic thermoplastic elastomer material. Alternatively, the support spring 30 may be made from a metal material. The polymer spring offers advantages such as not suffering from risk of corrosion when installed in the outdoor elements as compared to metal springs. The polymer spring may also offer advantages during field installations compared to metal springs such as being safer (lower risk of uncontrolled release) and being easier to install due to its smaller size and lower weight. According to some embodiments where the cable management system 100 is used for substantially horizontal installation scenarios, the support spring 30 may not be included within the slider channel 31.

Figure 3:
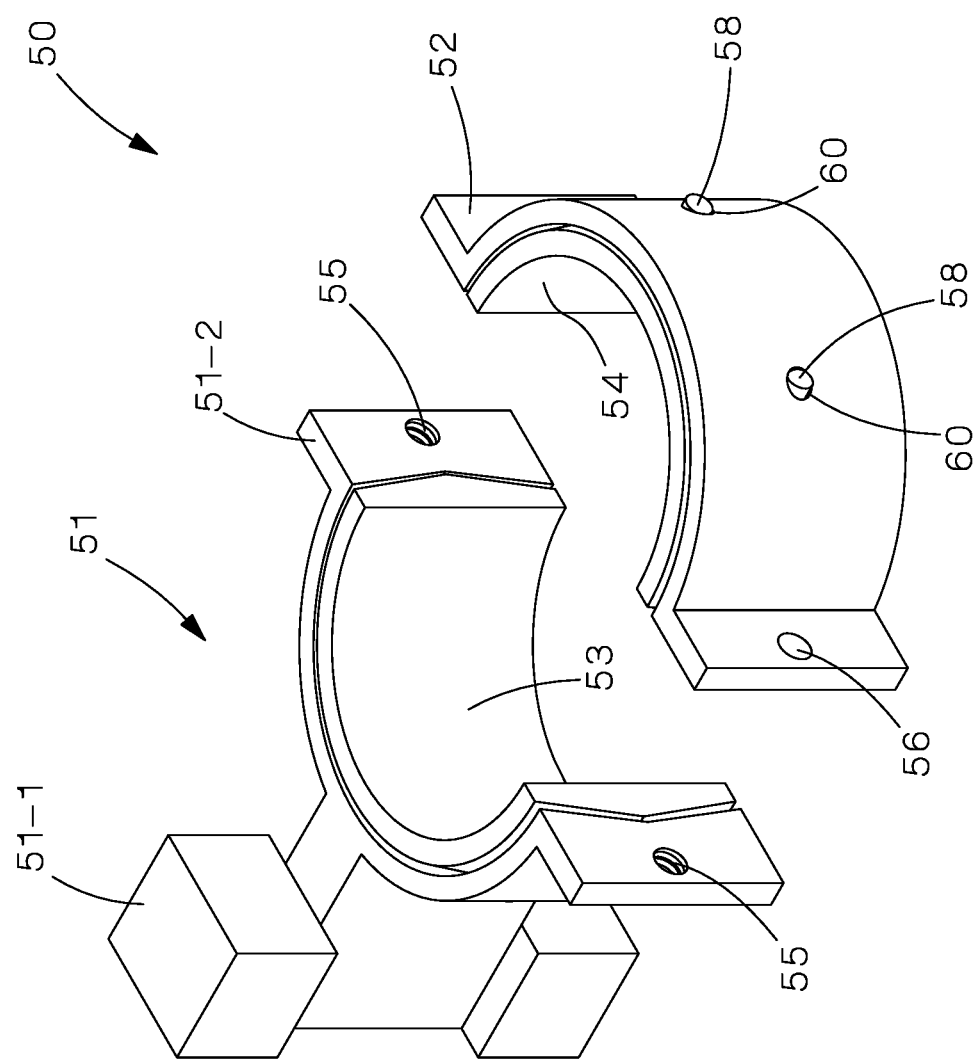
FIG. 3 is a partially exploded view of a cable clamp included in the cable management system shown in FIG. 1.

FIG. 3 shows a partially exploded view of the cable clamp assembly 50. The cable clamp assembly 50 includes a lower clamp 51 and an upper clamp 52. The lower clamp 51 is comprised of two portions, namely a stem portion 51-1 and a clamp portion 51-2. The stem portion 51-1 takes on a substantially cubed shape to fit securely (i.e., snuggly) through the slider channel 31 and travel within the slider channel 31. The stem portion 51-1 may travel within the slider channel 31 until it rests on top of the support spring 30 in a vertical installation scenario. The clamp portion 51-2 of the lower clamp 51 and the upper clamp 52 are formed into semi-cylindrical shapes to come together around the cable 20. To provide a more secure fit with the cable 20, the cable clamp assembly 50 may also include a compression grommet sleeve comprise of a first sleeve 53 and a second sleeve 54. The first sleeve is placed into the lower clamp 51 and the second sleeve 54 is placed into the upper clamp 52, as shown in FIG. 3. The compression grommet may be made from rubber, polymer, sponge, or other elastic material. The surface of the compression grommet coming into contact with the clamp portion 51-2 and/or the upper clamp 52, may be shaped (e.g., convex "V" shaped) to abut into an inner surface of the clamp portion 51-2 and/or the upper clamp 52 that is shaped to receive the first sleeve 53 and the second sleeve 54, as described in more detail below.

Figure 4:
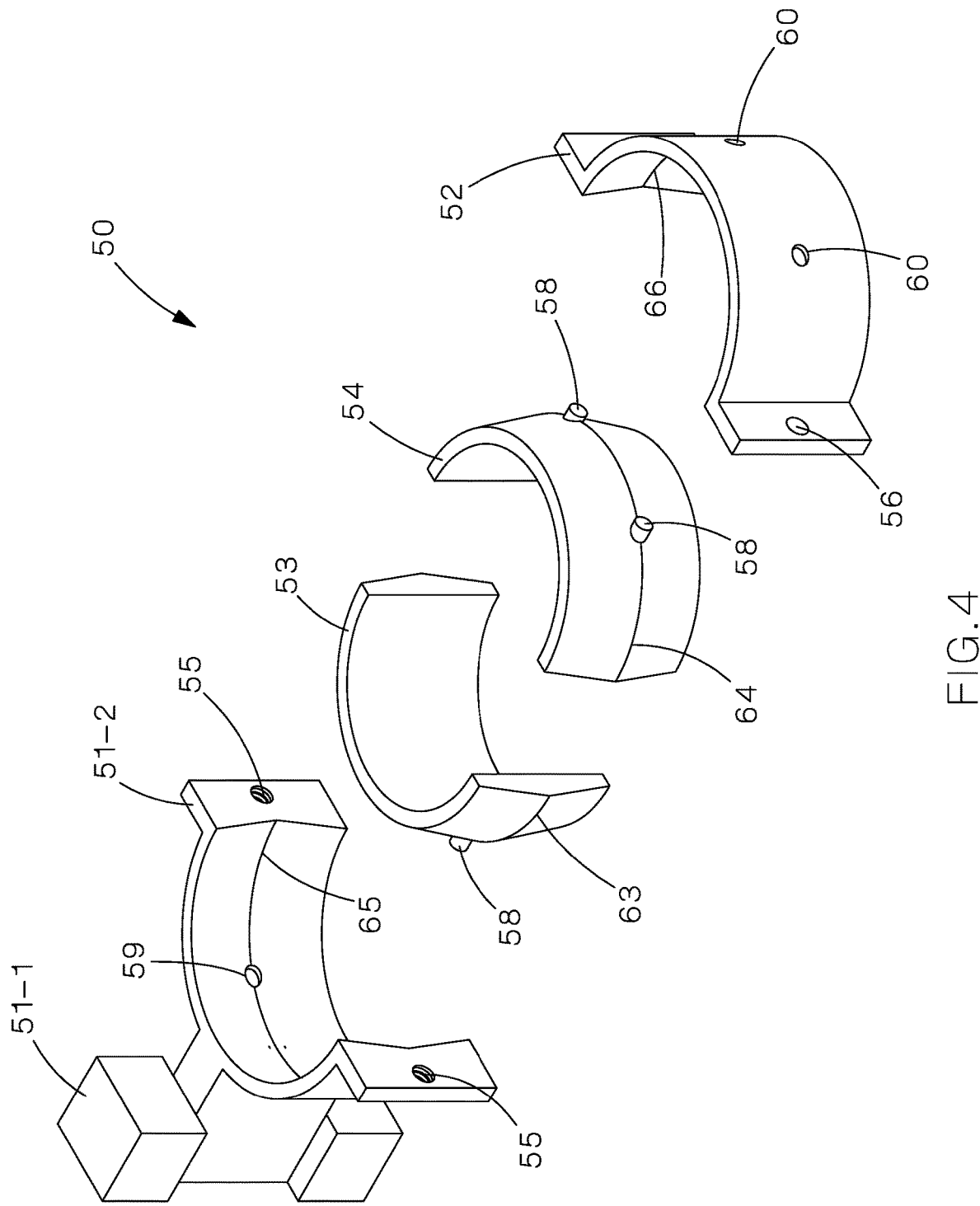
FIG. 4 is an exploded view of the cable clamp included in the cable management system shown in FIG. 1.

FIG. 4 shows an exploded view of the cable clamp assembly 50. The compression grommet sleeves (first sleeve 53 and second sleeve 54) respectively include both a v-shaped curve 63, 64 and retainment tabs 58 to secure attachment onto the lower clamp 51 and the upper clamp 52, respectively. For example, the v-shaped curve 63 on the first sleeve 53 is shaped to fit within a v-groove of the clamp portion 51-2 in the lower clamp 51, and the retainment tabs 58 protruding from the first sleeve 53 are further configured to fit within receiving holes 59 included the clamp portion 51-2 in the lower clamp 51. Similarly, the v-shaped curve 64 on the second sleeve 54 is shaped to fit within a v-groove 66 of the upper clamp 52, and the retainment tabs 58 protruding from the second sleeve 54 are further configured to fit within receiving holes 60 included in the upper clamp 52. Although two retainment tabs 58 are shown to be included on each of the first sleeve 53 and the second sleeve 54, one or more retainment tabs 58 may be included on the first sleeve 53 and/or the second sleeve 54 according to other embodiments, with the lower clamp 51 and the upper clamp 52 adjusting their number of receiving holes 59, 60 accordingly. According to still other embodiments, the first sleeve 53 and/or the second sleeve 54 may include no retainment tabs 58. According to still other embodiments, the first sleeve 53 and/or the second sleeve 54 may not include their respective v-shaped curves 63, 64 with the clamp portion 51-2 in the lower clamp 51 and the upper clamp 52 also removing their respective v-grooves 65, 66 accordingly, and instead providing a flat surface.

To initiate an installation of a cable onto the cable management system 100, the compression grommet is attached to the cable clamp assembly 50. Attaching the compression grommet to the cable clamp assembly 50 includes attaching the first sleeve 53 to the clamp portion 51-2 and attaching the second sleeve 54 to the upper clamp 52 using one or more of the attachment mechanisms described herein. Then the lower clamp 51 is lowered into the slider channel 31 in the direction B until the lower clamp 51 rests on top the support spring 30, as shown in FIGS. 5-6.

To continue the installation, the cable 20 is placed into the lower clamp 51 by abutting the cable 20 against the first sleeve 53. FIG. 6 shows the lower clamp 51 installed into the slider strut 3, and the cable 20 placed between the lower clamp 51 and the upper clamp 52, where the cable 20 is ready to be installed into the cable clamp assembly 50. Then with the cable 20 is placed into the lower clamp 51, the upper clamp 52 (having the second sleeve 54 attached) is brought together with the lower clamp 51 to surround and securely hold the cable 20 between them as shown in FIG. 2.

As shown in FIG. 4, the lower clamp 51 includes threaded holes 55 that are configured to line up with through holes 56 on the upper clamp 52 when the lower clamp 51 and the upper clamp 52 are brought together to achieve the assembled state of the cable clamp assembly 50. So as part of a final step in the installation process, as the threaded hole 55 and the through holes 56 line up with each other to present an open passage, the fasteners 61 (e.g., threaded bolts) are inserted through the open passage provided through the threaded holes 55 and the through holes 56 from the side of the upper clamp 52. Then the fasteners 61 are mated with a termination piece 62 (e.g., nuts) on the side of the lower clamp 51. The fasteners 61 are torqued to compress the attached compression grommet sleeve (first sleeve 53 and second sleeve 54) around the cable 20. The v-grooves 65, 66 and the v-shaped curves 63, 64 of the compression grommet sleeve work together to resist movement of the cable 20 within the cable clamp assembly 50. The fasteners 61 are shown to be hex head bolts, but may also be other types of fastener that can be torqued and be mated by a termination piece 62 on the side of the lower clamp 51.

Figure 5:
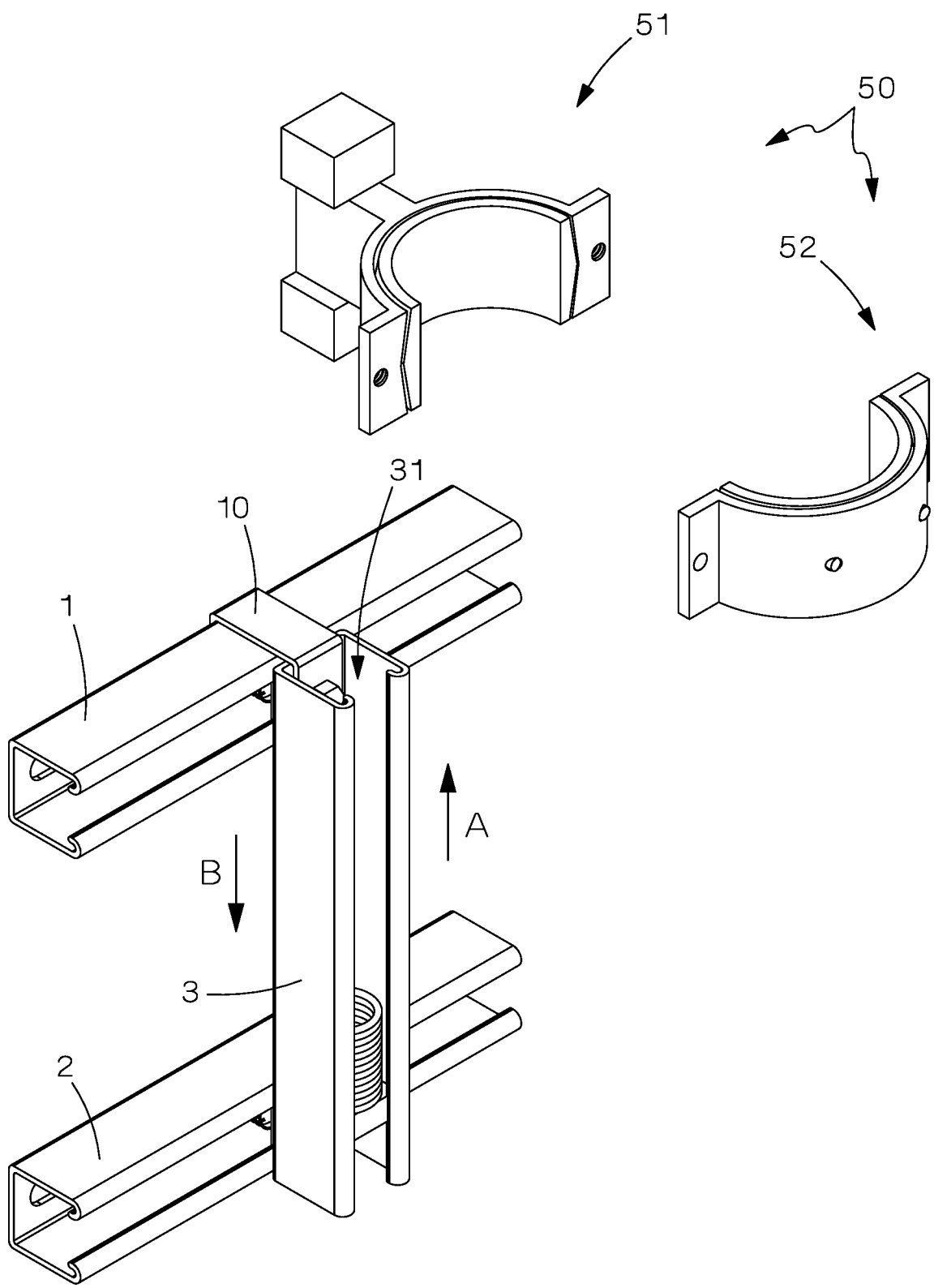
FIG. 5 is a partially exploded view of the cable management system shown in FIG. 1, where the cable clamp is outside a slider channel.
Figure 6:
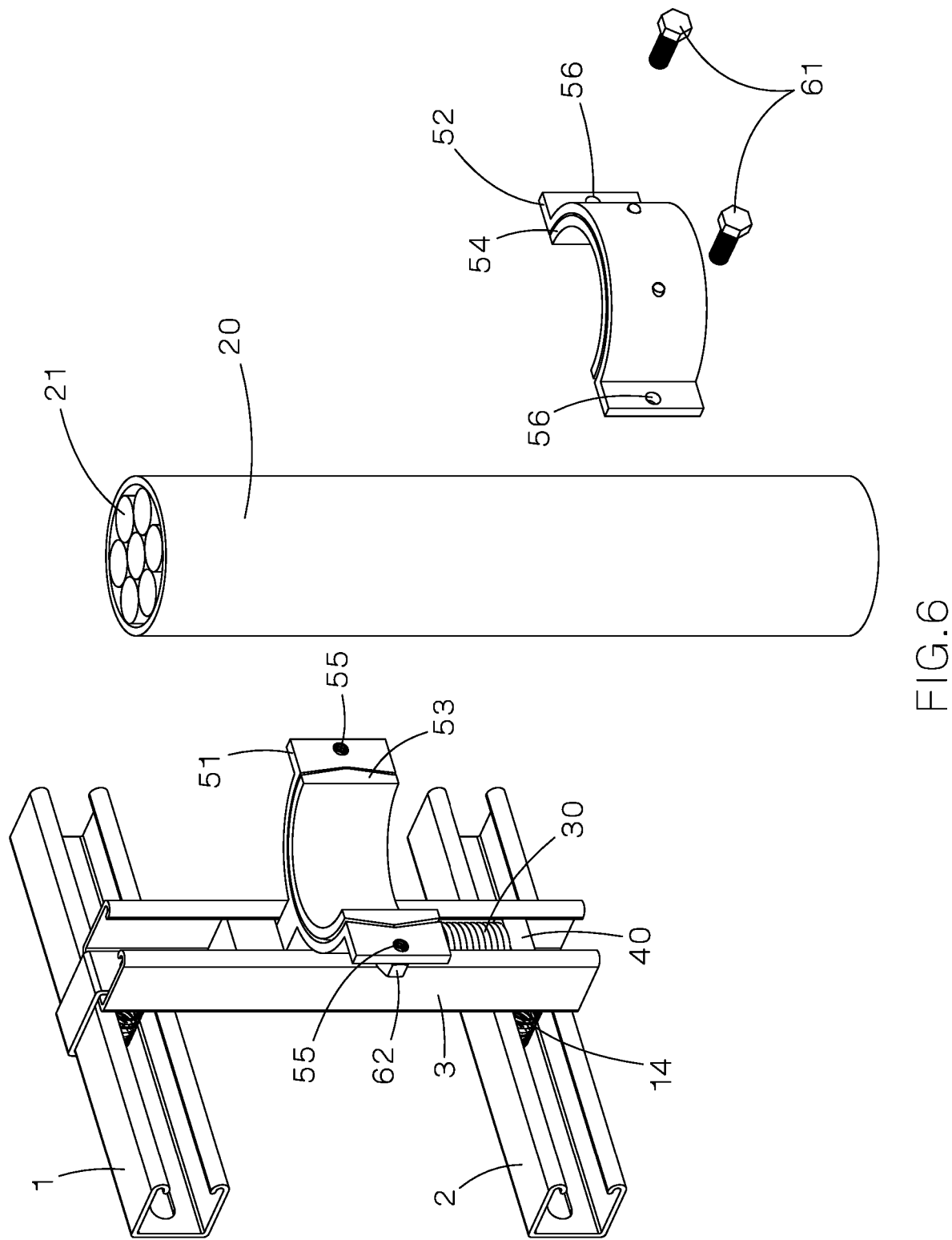
FIG. 6 is a partially exploded view of the cable management system shown in FIG. 1, where the cable clamp is installed into the slider channel and is ready to receive the cable.

After installation, the upper clamp 52 may be removed by raising the lower clamp 51 up the slider channel 31 in the direction A, as shown in FIG. 5.

Figure 7:
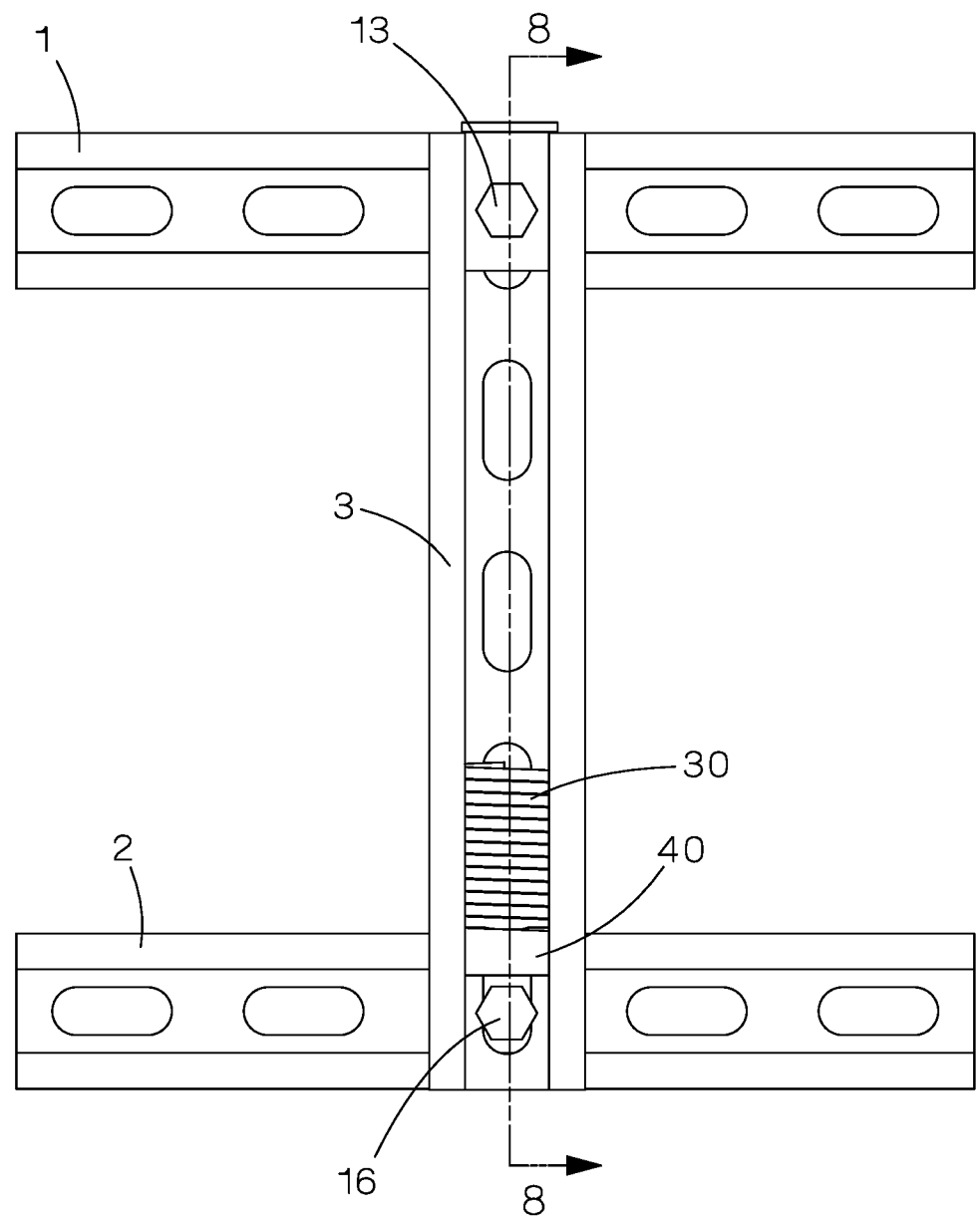
FIG. 7 is a front facing view of a strut assembly included in the cable management system shown in FIG. 1.
Figure 8:
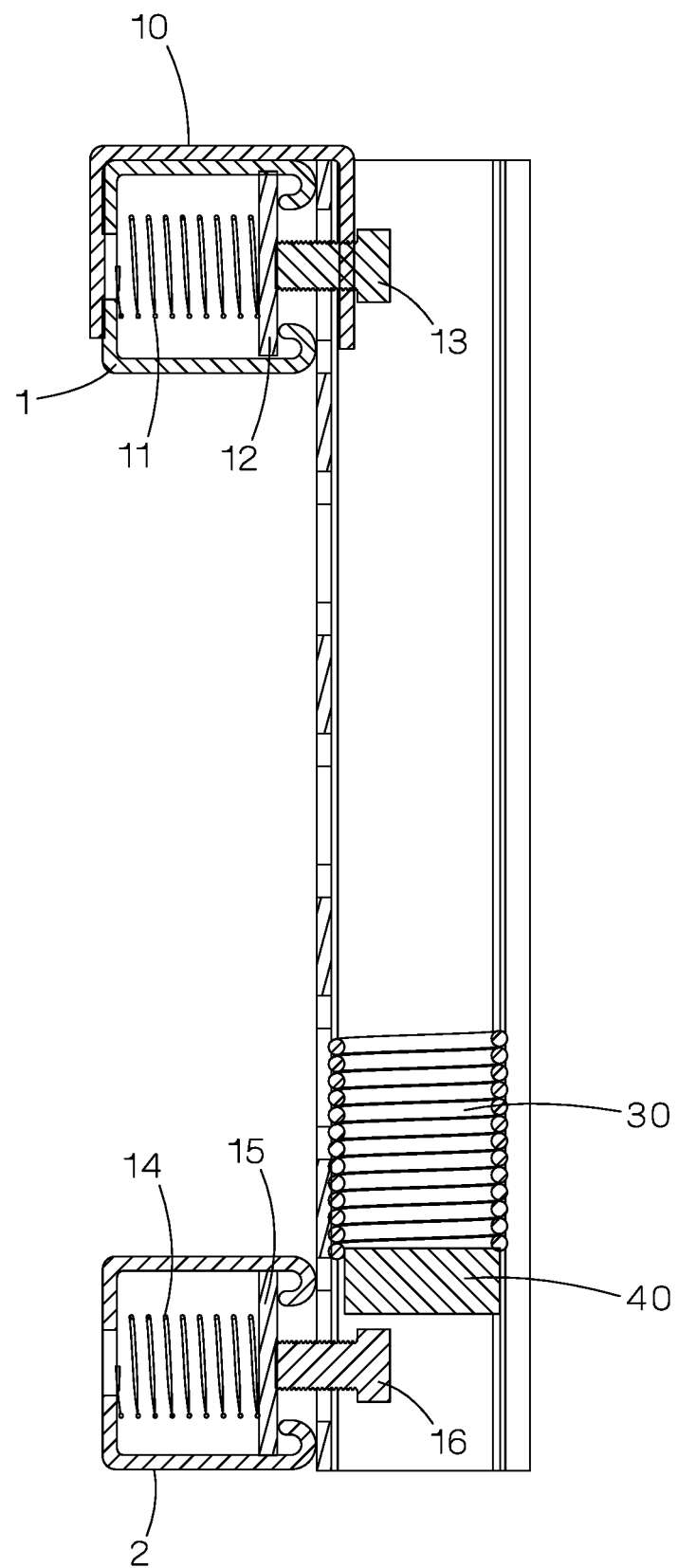
FIG. 8 is a sectional view of the strut assembly taken along line 8-8 from FIG. 7.

FIG. 7 shows a front view of the slider strut 3 being attached to the first strut 1 and the second strut 2. FIG. 8 shows a sectional view taken along line 8-8 from FIG. 7, where the sectional view shown in FIG. 8 illustrates how the slider strut 3 is attached to the first strut 1 by an installation hook 10 and a first strut nut assembly that includes a fastener 13 and a strut nut 12. According to the embodiments disclosed by FIG. 8, the strut nut 12 includes a strut nut spring 11, although according to other embodiments the strut nut 12 may not include the strut nut spring 11. On the other end, the slider strut 3 is attached to the second strut 2 by a second strut nut assembly that includes a fastener 16 and a strut nut 15. According to the embodiments disclosed by FIG. 8, the strut nut 15 includes a strut nut spring 14, although according to other embodiments the strut nut 15 may not include the strut nut spring 14.

Furthermore, while the particular embodiments described herein have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective.

What is claimed is:

1. A cable management system comprising:
 a slider strut comprising:
  a slider channel; and
  an elastic element installed within the slider channel; and
 a cable clamp comprising:
  a lower clamp installed within the slider channel, wherein at least a portion of the lower clamp is configured to translate within the slider channel to abut against the elastic element; and
  an upper clamp configured to attach to the lower clamp via at least one fastener.

2. The cable management system of claim 1, the cable clamp further comprising:
 a first compression grommet sleeve configured to attach to the lower clamp; and
 a second compression grommet sleeve configured to attach to the upper clamp.

3. The cable management system of claim 1, wherein the lower clamp comprises:
 a stem portion being the portion of the lower clamp configured to fit and translate within the slider channel; and
 a clamp portion.

4. The cable management system of claim 1, the cable clamp further comprising:
 a first compression grommet sleeve configured to attach to the lower clamp; and
 a second compression grommet sleeve configured to attach to the upper clamp;
 wherein the lower clamp includes a first v-groove and the first compression grommet sleeve includes a first v-shaped curve configured to fit into the first v-groove of the lower clamp; and
 wherein the upper clamp includes a second v-groove and the second compression grommet sleeve includes a second v-shaped curve configured to fit into the second v-groove of the upper clamp.

5. The cable management system of claim 1, the cable clamp further comprising:
 a first compression grommet sleeve configured to attach to the lower clamp; and
 a second compression grommet sleeve configured to attach to the upper clamp;
 wherein the first compression grommet sleeve includes a first retainment protrusion, and the lower clamp includes a first receiving hole for receiving the first retainment protrusion; and
 wherein the second compression grommet sleeve includes a second retainment protrusion, and the upper clamp includes a second receiving hole for receiving the second retainment protrusion.

6. The cable management system of claim 1, wherein the elastic element is a polymer spring.

7. The cable management system of claim 1, wherein the elastic element is located at a bottom end of the slider channel.

8. The cable management system of claim 1, further comprising an attachment assembly configured to attach the cable management system to a device strut.

9. The cable management system of claim 8, wherein the attachment assembly comprises an installation hook, a fastener, a strut nut, and a strut nut spring.

10. The cable management system of claim 1, further comprising a rigid stop attached within the slider channel, wherein the elastic element rests on top of the rigid stop.

11. A cable management system comprising:
 a slider strut comprising:
  a slider channel; and
  stopping member positioned within the slider channel; and
 a cable clamp comprising:
  a lower clamp installed within the slider channel, wherein at least a portion of the lower clamp is configured to translate within the slider channel to abut against the stopping member; and
  an upper clamp configured to attach to the lower clamp via at least one fastener.

12. The cable management system of claim 11, the cable clamp further comprising:
 a first compression grommet sleeve configured to attach to the lower clamp; and
 a second compression grommet sleeve configured to attach to the upper clamp.

13. The cable management system of claim 11, wherein the lower clamp comprises:
 a stem portion being the portion of the lower clamp configured to fit and translate within the slider channel; and
 a clamp portion.

14. The cable management system of claim 11, the cable clamp further comprising:
 a first compression grommet sleeve configured to attach to the lower clamp; and
 a second compression grommet sleeve configured to attach to the upper clamp;
 wherein the lower clamp includes a first v-groove and the first compression grommet sleeve includes a first v-shaped curve configured to fit into the first v-groove of the lower clamp; and
 wherein the upper clamp includes a second v-groove and the second compression grommet sleeve includes a second v-shaped curve configured to fit into the second v-groove of the upper clamp.

15. The cable management system of claim 11, the cable clamp further comprising:
 a first compression grommet sleeve configured to attach to the lower clamp; and
 a second compression grommet sleeve configured to attach to the upper clamp;
 wherein the first compression grommet sleeve includes a first retainment protrusion, and the lower clamp includes a first receiving hole for receiving the first retainment protrusion; and
 wherein the second compression grommet sleeve includes a second retainment protrusion, and the upper clamp includes a second receiving hole for receiving the second retainment protrusion.

16. The cable management system of claim 11, wherein the stopping member is located at a top end of the slider channel.

17. The cable management system of claim 11, wherein the stopping member is located at a bottom end of the slider channel.

18. The cable management system of claim 11, further comprising an attachment assembly configured to attach the cable management system to a device strut.

19. The cable management system of claim 18, wherein the attachment assembly comprises an installation hook, a fastener, a strut nut, and a strut nut spring.

20. The cable management system of claim 11, further comprising a capping member at a top end of the sliding channel.

\* \* \* \* \*